United States Patent [19]

Schwarze et al.

[11] 3,969,353
[45] July 13, 1976

[54] TRIAZINESULFENIMIDES OF DICARBOXYLIC ACIDS

[75] Inventors: Werner Schwarze, Frankfurt; Siegfried Wolff, Merten, both of Germany

[73] Assignee: Deutsche Gold- und Silber-Scheideanstalt vormals Roessler, Germany

[22] Filed: June 19, 1975

[21] Appl. No.: 588,649

[30] Foreign Application Priority Data
June 24, 1974 Germany............................ 2430143

[52] U.S. Cl................................. 260/249.5; 71/93; 260/249.8; 260/79.5 R
[51] Int. Cl.²............... C07D 251/46; C07D 251/52
[58] Field of Search....................... 260/249.5, 249.8

[56] References Cited
UNITED STATES PATENTS
3,801,537   4/1974   Westlinning et al............. 260/249.8

Primary Examiner—John M. Ford
Attorney, Agent, or Firm—Cushman, Darby

[57] ABSTRACT

There are prepared triazine sulphenimides of the formula

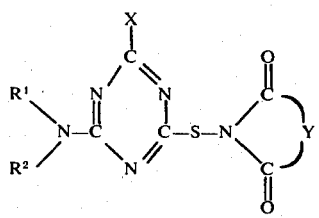

in which X is

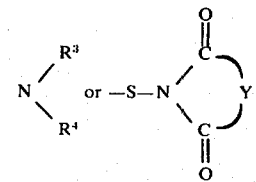

$R^1$, $R^2$, $R^3$ and $R^4$ are hydrogen or alkyl with 1 to 4 carbon atoms;

Y is —CH$_2$—CH$_2$—; —CH$_2$—CH$_2$—CH$_2$—; —CH(CH$_3$)—CH$_2$—;

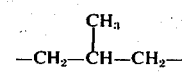

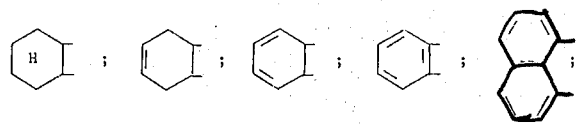

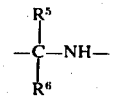

(where $R^5$ and $R^6$ are hydrogen, alkyl with 1 to 8 carbon atoms, alkylthioalkyl with a total of 2 to 8 carbon atoms, CH$_3$—S—, alkoxyalkyl with a total of 2 to 8 carbon atoms, CH$_3$O— or phenyl); or

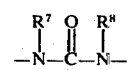

(where $R^7$ and $R^8$ are hydrogen, alkyl with 1 to 8 carbon atoms, allyl or phenyl). The compounds are useful as herbicides and as aids in rubber mixtures.

26 Claims, No Drawings

TRIAZINESULFENIMIDES OF DICARBOXYLIC ACIDS

This invention relates to new triazine sulphenimides containing a sulphenimide group derived from carboxylic acids once or twice on the symmetrical or 1,3,5-triazine ring. They have the general formula

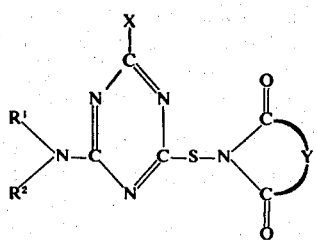

in which
X is

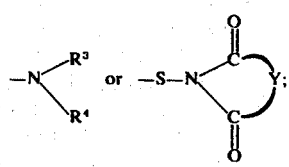

(where $R^1$, $R^2$, $R^3$ and $R^4$ are the same or different: hydrogen or alkyl with 1 to 4 carbon atoms);
Y is —$CH_2$—$CH_2$—; —$CH_2$—$CH_2$—$CH_2$—; —$CH(CH_3)$—$CH_2$—;

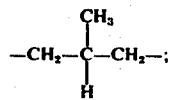

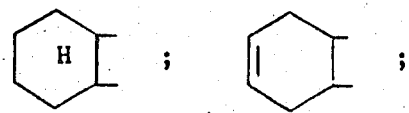

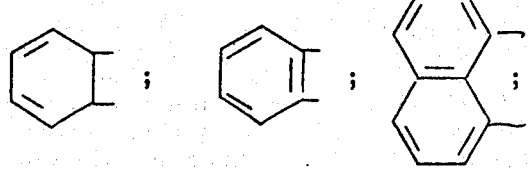

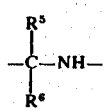

(where $R^5$ and $R^6$ are the same or different: hydrogen, alkyl with 1 to 8 carbon atoms, alkyl thioalkyl with a total of 2 to 8 carbon atoms, $CH_3$—S—, alkoxyalkyl with a total of 2 to 8 carbon atoms, $CH_3O$—or phenyl);

(wherein $R^7$ and $R^8$ are the same or different: hydrogen, alkyl with 1 to 8 carbon atoms, allyl or phenyl);

In general, the new triazine sulphenimides can be prepared as follows: the corresponding mercapto triazines are first reacted with chlorine or with chlorine donors, for example sulphuryl chloride, to form the sulphene chloride of the triazine. These are then reacted with imides corresponding to the general formula

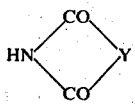

in which Y is as defined above. This condensation reaction is best carried out in the presence of an HCl-acceptor.

Imides of the claimed dicarboxylic acids are, for example, the imides of the following dicarboxylic acids: succinic acid (succinimide), methyl succinic acid, glutaric acid, methyl glutaric acid, 4-cyclohexene-1, 2-dicarboxylic acid, phthalic acid, tetrahydrophthalic acid, hexahydrophthalic acid, naphthalic acid and also the compounds which may be considered as imides, namely hydantoin and the above-mentioned hydantoin derivatives such as, for example, the hydantoins substituted once or twice in the 5-position by methyl, ethyl, butyl, octyl, or phenyl, also the isocyanurates and the above-mentioned N,N'-dialkyl- and diphenyl-isocyanurates, etc.

The sulphene chlorides of the triazine can be reacted with the imides in homogeneous and in heterogeneous phase. In cases where the reaction is carried out in homogeneous phase, organic HCl acceptors, preferably tertiary bases such as trimethylamine, triethylamine, tributylamine, N-methyl morpholine, etc., can be used for the condensation. In cases where the reaction is carried out in the two-phase system, suitably with water as one phase and with an organic solvent as the second phase, inorganic compounds, for example sodium hydroxide, potassium hydroxide, sodium or potassium carbonate and the like, can also be used in addition to the organic HCl acceptors.

The condensation temperatures varying and may be experimentally determined. In general, the condensation temperature is governed by the particular procedure selected and by the type of imide used. In cases where condensation is carried out in homogeneous phase, temperatures of up to 100°C may be used, whereas condensation in the two-phase system requires low temperatures because the imide ring may be opened at excessively high temperatures. As already mentioned, the starting compounds, namely the sulphene chlorides of the s-triazine compounds, can be obtained by reacting the corresponding mercapto triazines with chlorine or chlorine donors in inert solvents. Inert solvents are, for example, methylene chloride, chloroform, carbon tetrachloride, dichloroethane, trichloroethane, chlorobenzene, dichlorobenzene, trichlorobenzene and the like. It is best to carry out the chlorination reaction at low temperatures because otherwise the yield decreases. Instead of using the mercapto triazines, it is also possible to use the ditriazinyl disulphides. On completion of chlorination, the excess chlorine has to be removed from the solution of the sulphene chloride, for example by blowing out with nitrogen or other inert gases or by partly distilling off the solvent.

Condensation of the sulphene chloride compounds with the imides is with advantage carried out in the same solvent or solvent mixture in which chlorination was carried out. However, the sulphene chloride solution can also be first completely freed from the inert solvent, for example by continuous evaporation, for example by means of a Sambay evaporator. Thereafter the liquid or solid sulphene chloride may be dissolved in benzene, toluene, dioxan, ether or other inert organic solvents which normally do not react with chlorine, and further reacted.

In most cases, the claimed compounds are white or light-colored crystalline substances some of which are very stable.

The invention also relates to a process for the production of s-triazine sulphenimides corresponding to formula I above, with the definitions given after that formula, wherein sulphene halides corresponding to the formula

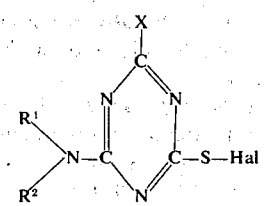

III in which Hal represents chlorine or bromine and in which $R^1$, $R^2$ and X are as defined above, are reacted with imides corresponding to formula II above, in which Y is as defined above, in homogeneous phase at below about 50°C and, especially, at temperatures in the range from −10° to 50°C, or in heterogeneous phase at temperatures below about 25°C, preferably at temperatures below about 10°C and more especially at temperatures in the range from −10° to +10°C.

The reaction in organic solvents using organic hydrogen halide acceptors known per se is a possible and expedient alternative of the process according to the invention.

However, it is also possible to work in a two-phase system in which one phase is preferably water, in which case inorganic alkali compounds are used as hydrogen halide acceptors, whilst the other phase is an organic solvent or solvent mixture.

The above-mentioned sulphene halides, especially the sulphene chlorides, are known per se. Sulphenamides of triazine are also already known (see British Pat. Specification No. 1,201,862 and Westlinning U.S. Pat. No. 3,801,537). These known compounds are excellent vulcanisation accelerators.

PREPARATION EXAMPLES

1. Preparation of 2-diethylamino-4,6-bis-(5,5-dimethylhydantoyl thio)-triazine.

43.2 g (0.2 mol) of 2-diethylamino-4,6-dimercapto triazine were suspended in 250 ml of methylene chloride. 64.8 g of sulphuryl chloride were added dropwise with stirring at 0°C. The mercapto triazine entered into solution, and this was followed by stirring for another hour. The solution was then evaporated by concentration in vacuo at 12 Torr and 25°C. The residual triazine sulphene chloride was a honey-yellow oil which was taken up into 250 ml of toluene.

53.8 g of 5,5-dimethyl hydantoin, 250 ml of $H_2O$ and 16.8 g of sodium hydroxide were then mixed and the resulting mixture cooled to 0°C. The filtered toluene solution of the triazine sulphene chloride was then added dropwise with vigorous stirring at 0° to 5°C. The reaction was over after about 30 minutes, as reflected by the neutral reaction.

The mixture was filtered under suction, the residue left on the suction filter washed with water and dried, leaving white crystals which began to decompose at a melting point of 170°C. The residue weighed 72.5 g, corresponding to a yield of 78% of the theoretical.

The hydantoinyl group can also be referred to in short as the hydantoyl group.

2. Preparation of 2-diethylamino triazinyl-4,6-bis-thio-(3,5-dimethylisocyanurate).

65.6 g (0.23 mol) of 2-diethylamino-4,6-bis-sulphenyl chloride were dissolved in 150 ml of dry dioxan.

In addition 72 g (0.46 mol) of 3,5-dimethyl isocyanurate were dissolved in 250 ml of dimethylacetamide, followed by the addition of 48 g of triethylamine. The sulphenyl chloride solution described above was then added dropwise to the isocyanurate solution at 0° to 5°C. On completion of the reaction, the mixture showed a neutral reaction. The whole was then poured into 2 liters of water, filtered under suction and the residue washed with water. After drying, the residue was recrystallized from dioxan. A quantity of 53.4 g was obtained corresponding to a yield of 44% of the theoretical. The product thus obtained was in the form of white crystals melting at 270° to 272°C.

3. Preparation of 2-diethylamino-4,6-bis-succinimido-thio triazine.

43.2 g (0.2 mol) of 2-diethylamino-4,6-dimercapto triazine were suspended in 250 ml of carbon tetrachloride. This triazine compound was reacted at 0° to 10°C with 64.8 g of sulphuryl chloride to form the corresponding sulphene chloride, after which about half the solvent was evaporated off.

44 g of succinimide were then dissolved in 250 ml of dimethyl formamide, followed by the addition of 60 g of triethylamine. The carbon tetrachloride solution of the sulphene chloride was then added to this solution at 0 to 10°C, followed by stirring for 2 hours at room temperature. After concentration by evaporation in vacuo, the product was taken up with water, filtered under suction and the residue on the suction filter dried. A crud yield of 76.5 was obtained. Recrystallisation from a mixture of dioxane and dimethyl formamide in a ratio of 3:1 give 57.5 g of pure substance melting at 239° to 241°C. The yield amounted to 70.1% of the theoretical.

An alternative method of preparation was carried out as follows. The carbon tetrachloride solution of the sulphene chloride of the triazine was run at 0°C into a solution of 44 g of succinimide in an aqueous sodium hydroxide solution (9 g of NaOH in 300 ml of water). Working up gave the desired end product in a yield of 67.5%.

4. Preparation of 2-dimethylamino-4,6-bis-succinimidothio-triazine.

37.6 g (0.2 mol) of 2-dimethylamino-4,6-dimercapto-triazine were introduced at 0°C into a solution of 16 g of chlorine in 250 ml of dichloroethane. After stirring for 30 minutes, the hydrogen chloride was blown out of the solution with dry air.

50 g of succinimide in a solution of 20 g of NaOH in 250 ml of H$_2$O were then introduced into a spherical flask equipped with a dropping funnel and cooled to 0°C. The sulphene chloride solution described above was then added dropwise. After a residence time of 2 hours, the reaction mixture was worked up as follows: concentrate by evaporation in vacuo, take up with water, filter under suction, wash the residue on the suction filter, dry and recrystallise from isopropanol. In this way, white crystals melting at 258° to 259°C are obtained in a quantity of 57.1 g, corresponding to a yield of 74.7% of the theoretical.

5. Preparation of 2-ethylamino-4-diethylamino-6-phthalimido-thiotriazine.

59.6 g of 2-ethylamino-4-diethylamino-6-chlorosulphenyl triazine hydrochloride were gradually introduced into a mixture of 29.4 g of phthalimide, 40 g of triethylamine and 300 ml of dimethyl formamide. The temperature of the reaction mixture was not allowed to rise above 25°C. A thick crystal sludge was formed, which was filtered off under suction after 2 hours. It was washed with water, dried and recrystallised from a mixture of dimethyl formamide and isopropanol in a ratio of 1:1. White crystals melting at 187° to 188°C were obtained in a yield of 51.4 g, corresponding to 69.2% of the theoretical.

6. Preparation of 2-diethylamino-4,6-bis-phthalimido-thiotriazine.

71.3 g of 2-diethylamino-4,6-bis-chlorosulphenyl triazine were dissolved in 150 ml of dimethyl formamide. The resulting solution was then added dropwise with cooling to a dispersion of 72.5 g of phthalimide and 65.7 g of triethylamine in 250 ml of dimethyl formamide, the temperature being kept by cooling below 45°C. After stirring for about another hour at 45°C, the mixture was poured into 2 liters of water, filtered under suction, the residue left on the suction filter washed and dried. Recrystallisation from dimethyl formamide gave white crystals, melting at 256° to 257°C in a yield of 84.2 g, corresponding to 6.44% of the theoretical.

Other compounds according to the invention are inter alia: 2-dimethylamino-4,6-bis-(hydantoylthio)-triazine, 2-ethylamino-4,6-bis-(5-methylmercaptoethyl hydantoylthio)-triazine, 2-n-butylamino-4,6-bis-(5-methylhydantoylthio)-triazine, 2-ethylamino-4-diethylamino-6-hydantoylthio triazine, 2,4-bis-diethylamino-6-(5-isopropyl hydantoylthio)-triazine, 2,4-bis-n-butylamino-6-(5-ethylhydantoylthio)-triazine, 2-methylamino-4-n-butylamino-6-(5-n-propylhydantoylthio)-triazine, 2-methylamino-triazinyl-(4,6)-bis-thio-3,5-dimethyl -dimethyl cyanurate, 2-ethylamino-4-diethylamino-triazinyl-6-thio-3,5-diethyl cyanurate, 2-amino-4-diethylamino-triazinyl-6-thio-3,5-dibutyl cyanurate, 2-n-butylamino-triazinyl-(4,6)-bis-thio-3,5-dimethyl cyanurate, 2-dimethylamino-4,6-bis-succinimido-thio-triazine, 2-amino-4,6-bis-succinimido-thio-triazine, n-butylamino-4,6-bis-succinimido-thio-triazine, 2-amino-4-diethylamino-6-succinimido-thio-triazine, 2,4-bis-ethylamino-6-succinimido-thio-triazine, 2-dimethylamino-4,6-bis-glutarimido-thiotriazine, 2-diethylamino-4-ispropylamino-6-glutarimido-thio-triazine, 2,4-bis-ethylamino-6-phthalimidothiotriazine, 2-amino-4-diethylamino-6-phthalimidothiotriazine, 2-ethylamino-4,6-bis-phthalimidothiotriazine, 2-n-butylamino-4,6-bis-phthalimidothiotriazine, 2-n-butylamino-4,6-bis-phthalimidothiotriazine, 2-diethylamino-4,6-bis-tetrahydrophthalimidothiotriazine, 2-methylamino-4-isopropylamino-6-tetrahydrophthalimidothiotriazine, 2-amino-4-n-butylamino-6-tetrahydrophthalimidothiotriazine, 2-di-n-butylamino-4,6-bis-naphthalimidothiotriazine, 2-methylamino-4-ethylamino-6-naphthalimidothiotriazine, 2-diethylamino-4-n-butylamino-6-hexahydrophthalimidothiotriazine, 2,4-bis-dimethylamino-6-hexahydrophthalimidothiotriazine, 2,4-bis-n-propylamino-6-phthalimido-thio-s-triazine, 2-di-n-propylamino-4-diethylamino-6-succinimido-thio-s-triazine, 2,4-bis-i-propylamino-6-methylsuccinimido-thio-s-triazine, 2,4-bis-i-butylamino-6-glutarimido-thio-triazine, 2-ethylamino-4-diethylamino-6-[5-(2-methyl-thio-ethyl)-hydantoyl-thio]-s-triazine, 2,4-bis-i-butylamino-6-(4-cyclohexene-1,2-dicarbonimido-thio)-s-triazine, 2-di-n-butylamino-4,6-bis-[5-(2-methoxyethyl)-hydantoylthio]-s-triazine, 2,4-bis-i-propylamino-6-dimethylglutarimido-thio-s-triazine, 2-n-butylamino-4,6-bis-(5-methylhydantoyl-thio)-s-triazine, 2,4-diamino-6-hydantoylthiotriazine, 2-ethylamino-4-dibutylamino-6-(5,5-diethylhydantoyl-thio)-triazine, 2-dimethylamino-4,6-bis-(2-methylglutarimylo thio-triazine, 2-methylamino-4,6-bis (5-n-butylhydantoylthio)-triazine, 2-ethylamino-4,6-bis (5,5-di-n-butylhydantoylthio)triazine, 2-dimethylamino-4,6-bis (5,5-dioctylhydantoylthio)-triazine, 2-n-propylamino-4,6-bis-(5-butylmercapto-butylhydantoylthio)-triazine, 2-isopoylamino-4,6-bis- (5-methylmercaptomethylthio)-triazine, 2-dipropylamino-4,6-bis (5-methylmercaptohydantoylthio)-triazine, 2-di-sec butylamino-4,6-bis [5-(pentoxypropyl)-hydantoylthio]-triazine, 2-diethylamino-4,6-bis-(5-methoxyhydantoylthio)-triazine, 2-dimethylamino-4,6-bis (5,5-diphenylhydantoylthio-triazine, 2-isopropylamino-4-isopropylamino-6-(5-phenylhydantoylthio)-triazine, 2-n-butylaminotriazinyl-(4,6)-bis-thiocyanurate, 2,4-bis-(diethylamino)-driazinyl-6-thio-3,5-dioctylcyanurate, 2-propylamino-triazinyl-(4,6)-bis-thio-3,5-dialkylcyanurate, 2-amino-triazinyl-4,6)-bis-thio-3,5-diphenylcyanurate.

The new compounds may be used with advantage as herbicides, e.g., as pre-emergent or post-emergent herbicides for broad leaf weeds as processing aids for rubber mixtures and as intermediate products.

In the rubber-processing industry, the new s-triazine derivatives may be used for example as agents for increasing the processing-safety of unvulcanized rubber mixtures. It is known that, following their preparation in internal mixers or mills rubber mixtures are subjected to shaping or forming before vulcanisation. Forming is always accompanied by heat-generating mechanical work, such as rolling, extruding or calendering, and, takes place at elevated temperatures. The processing safety limit is reached or exceeded if vulcanisation begins during the forming process because, in that event, dimensionally stable, plastic forming is no longer possible. This limit can be displaced towards higher temperatures or longer processing times by using the substances according to the invention.

The new s-triazine derivatives are effective in mixtures containing natural or synthetic rubber vulcanizable with sulphur and/or sulphur donors. These mixtures suitably contain fillers as well as, for example the usual reinforcing carbon blacks and/or known white fillers, more especially reinforcing silicas, silicates of natural or synthetic origin, oxides of the metals aluminium, magnesium, calcium, zinc or titanium, and glass fibres or glass fibre products, also mixtures of these fillers with one another. In cases where only white fillers are used in the rubber mixtures, sulphur-containing silanes according to Belgian Pat. No. 787,691 and Meyer-Simon U.S. Pat. No. 3,842,111 may be used with advantage in the mixtures *). The entire disclosure of Meyer-Simon is incorporated by reference and relied upon. This combined use of two very different reinforcing additives is of especial advantage for example in the production of tire treads for vehicle tires. Such silanes include for example bis-3-triethoxysilyl-propyl)-trisulfide, bis-(3-triethoxysilylpropyl)-tetrasulfide, bis-(3-trimethoxysilylpropyl)-trisulfide, bis-(3-trimethoxysilylpropyl)-tetrasulfide, bis-(3-diethoxy ethylsilypropyl)-trisulfide, bis-(3-diethoxy ethylsilyl-propyl)-tetrasulfide or any of the other silanes shown in Meyer Simon, for example those set forth on column 2, line 56 to column 3, line 39. Thus the silanes can have the formula Z-alk-$S_n$-alk-Z in which Z is:

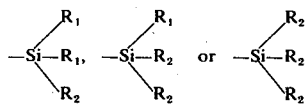

and in which $R_1$ is an alkyl group of 1 to 4 carbon atoms or phenyl and $R_2$ is an alkoxy group with 1 to 8, preferably 1 to 4 carbon atoms, a cycloalkyl group with 5 to 8 carbon atoms or a straight or branched chain alkylmercapto group with 1 to 8 carbon atms. All the $R_1$ and $R_2$ groups ca be the same or different. Alk is a divalent hydrocarbon group with 1 to 18 carbon atoms. It can be straight or branched chain and can be a saturated aliphatic hydrocarbon group, and unsaturated aliphatic hydrocarbon group or a cyclic hydrocarbon group. Preferably alk has 1 to 6, most preferably 2 or 3 carbon atoms and n is a number of 2 to 6, especially 2 to 4, most preferably 3 to 4. Mixtures of the silanes can be used.

*) in amounts of from 0.1 to 50 parts by weight, preferably within the limits of 0.5 to 25 parts by weight based on 100 parts by weight of rubber.

The synthetic rubbers include, for example, polybutadiene, polyisoprene, butadiene-styrene copolymers, butadieneacrylonitrile copolymers, butyl rubber, terpolymers of ethylene, propylene and an unconjugated diene, the transpolypentenamer and other known elastomers of the types used in the rubber industry.

The new s-triazine derivatives are usually present in the rubber mixtures in quantities of from 0.1 to 10 parts by weight to 100 parts by weight of rubber, and more especially in quantities of from 0.2 to 5 parts by weight and preferably in quantities of from 0.3 to 3 parts by weight to 100 parts by weight of rubber.

Vulcanisation with sulphur may be accelerated by the usual organic rubber accelerators *), for example mercapto compounds of benzothiazole or s-triazine, the corresponding disulphides or sulphenamides such as, for example, N-cyclohexyl-2-benzothiazole sulphenamide, N-(tert.-butyl)-2-benzothiazole sulphenamide, 2-(morpholinothio)-benzothiazole and, more especially, the s-triazine sulphenamides according to German Pat. No. 1,669,954 and Westlinning U.S. Pat. No. 3,801,537. The entire disclosure of Westlinning is incorporated by reference and relied upon.

*) described in: "Vulkanisation und Vulkanisationshilfsmittel" by Werner Hofmann. Edited by Berliner Union GmbH, 1965.

The rubber mixtures may also contain any other known additives such as, for example, antidegradants, antiozonants, plasticisers, blowing agents, dyes, pigments, waxes, organic acids (stearic acid, benzoic acid, salicyclic acid) as well as lead oxide and activators.

EXAMPLE 1

0.5 Part by weight of the compound 2-diethylamino-4,6-bis-hydantoyl-thio-triazine was added to a mixture of the following composition:

| | |
|---|---|
| oil-extended styrene-butadiene rubber (SBR 1712) | 137.5 parts by weight |
| ISAF carbon black | 65 parts by weight |
| zinc oxide | 3 parts by weight |
| stearic acid | 1 part by weight |
| aromatic hydrocarbon plasticizer | 1.5 parts by weight |
| antidegradant N-(1,3-dimetyl-butyl)-N'-phenyl-p-phenylenediamine | 2 parts by weight |
| sulphur | 2 parts by weight |
| N-t-butyl-benzothiazyl-2-sulfenamide | 1.2 parts by weight |

The crosslinking isotherms of this mixture were measured at 155°C. The following values were obtained:

| $t_s$ in minutes | $k_v'$ in minutes$^{-1}$ | $D - D_a$ in Newton meters (Nm) |
|---|---|---|
| 12.7 | 357 | 6.551 |

For comparison, the crosslinking isotherms of the same mixture without the s-triazine compound were also measured at 155°C. The following results were obtained:

| $t_s$ in minutes | $k_v'$ in minutes$^{-1}$ | $D_\infty - D_a$ in Nm |
|---|---|---|
| 10.3 | 328 | 5.972 |

The expression $t_5$ represents the time required by the vulcanisation reaction to reach a conversion of 5% at the measuring temperature of 155°C. The longer this period of time, the greater the in processing safety of the rubber mixtures. The expression $D_\infty - D_a$ represents the final torque which is measured during recording of the crosslinking isotherms minus the torque of the unvulcanised mixture. Accordingly, this value represents the increase in torque caused by crosslinking of the mixture. Accordingly, it is an expression which reflects the yield of crosslinking sites and, hence, is a measure of the quality of the vulcanisates.

It can be seen from the measured values quoted above that the $t_5$ value is increased by 23% by adding 0.5 part by weight of the compound according to the invention, 2-diethylamino-4,6-bis-hydantoyl-thio-triazine. In other words, safety in processing is considerably increased under the influence of this compound.

At the same time, the expression $D_\infty - D_a$ is increased by 10%, in other words the yield of crosslinking sites is increased by the addition of this compound.

The expression $K_r'$ is the rate constant of the vulcanisation reaction which takes place in accordance with the first order. It is possible from the figures to draw the important conclusion that, although the new s-triazine derivatives delay the onset of the vulcanisation reaction, they do not have a retarding effect upon the vulcanisation reaction itself. Comparison of the velocity constants of the crosslinking reaction of the blank mixture with those of the mixture containing 0.5 part by weight of 2-diethylamino-4,6-bis-hy 0.5 part by weight of 2-diethylamino-4,6-bis-hydantoyl-thio-triazine, shows that the vulcanisation reaction is in fact slightly accelerated.

EXAMPLE 2

Quantities of 0.6 part by weight of various substances according to the invention were added to the base mixture consisting of

| | |
|---|---|
| butadiene-styrene rubber (SBR 1500) | 100 parts by weight |
| HAF carbon black | 40 parts by weight |
| zinc oxide | 3 parts by weight |
| stearic acid | 2 parts by weight |
| sulphur | 2 parts by weight |
| N-cyclohexylamine-2-benzothiazle-sulphenamide | 1 part by weight | and their effect measured by the method described in Example 1:

| | $t_5$ mins. | $D_\infty - D_a$ Nm |
|---|---|---|
| blank mixture(without any addition according to the invention) | 11.4 | 9.772 |
| + 0.6 part by weight of 2-dimethyl-amino-4,6-bis-succinimido-thio-triazine | 15.7 | 11.748 |
| + 0.6 part by weight of 2-diethyl-amino-4,6-bis-(5,5-dimethyl hydantoyl-thio)-triazine | 16.3 | 11.277 |
| + 0.6 part by weight of 2-diethyl-amino-4,6-bis-phthalimido-thio-triazine | 13.5 | 12.081 |
| + 0.6 part by weight of 2-diethyl-amino-4,6-bis-succinimido-thio-triazine | 16.5 | 12.503 |
| + 0.6 part by weight of 2-diethyl-amino-4-ethylamino-6-phthalimido-thio-triazine | 14.8 | 11.885 |

The measured values show that it is possible to obtain a considerable increase in safety during processing with the substances of different constitution according to the invention. In cases where this increase in the yield of crosslinks is not intended to be utilised or is unnecessary, it may be compensated by reducing the quantities of elemental sulphur added. The result of this is that the vulcanisates contain fewer polysulphidic bonds and, hence, are more resistant to reversion.

EXAMPLE 3

The substances according to the invention also increase the in processing safety of natural rubber containing compositions: Quantities of 0.5 part by weight of the compounds according to the invention 2-diethylamino-4,6-bis-succinimido-thio-triazine and 2-diethylamino-4,6-bis-hydantoyl-thio-triazine were added to mixtures of the composition:

| | |
|---|---|
| Smoked sheets (natural rubber) | 100 parts by weight |
| ISAF carbon black | 45 parts by weight |
| zinc oxide | 3 parts by weight |
| stearic acid | 2 parts by weight |
| aromatic hydrocarbon plasticizer | 3 parts by weight |
| antidegradant N-(1,3-dimethyl-butyl)-N'-phenyl-p-phenylenediamine | 2 parts by weight |
| sulphur | 2 parts by weight |
| N-t-butyl mercapto benzthiazolyl-2-sulphenamide | 0.6 part by weight | and the crosslinking isotherms measured at 145°C. The measured values obtained are set out below:

| | $t_5$ mins. | $D_\infty - D_a$ Nm |
|---|---|---|
| blank | 9.1 | 7.443 |
| + 0.5 part by weight of 2-diethyl-amino-4,6-bis-succinimido-thio-triazine | 13.8 | 8.512 |
| + 0.5 part by weight of 2-diethyl-amino-4,6-bis-hydantoyl-thio-triazine | 13.1 | 8.296 |

It can be seen that the s-triazine compounds according to the invention may also be used with advantage in natural rubber for increasing safety in processing, accompanied by an increase in the crosslinking yield.

What is claimed is:

1. A triazine sulphenimide of the formula

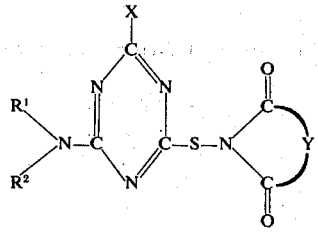

in which
X is

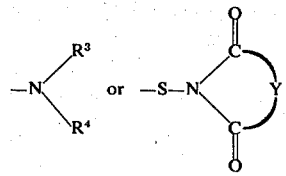

$R^1$, $R^2$, $R^3$ and $R^4$ are hydrogen or alkyl with 1 to 4 carbon atoms;
Y is $-CH_2-CH_2-$; $-CH_2-CH_2-CH_2-$; $-CH(CH_3)-CH_2-$;

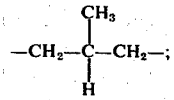

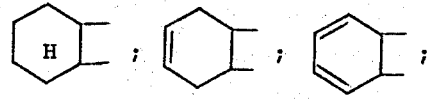

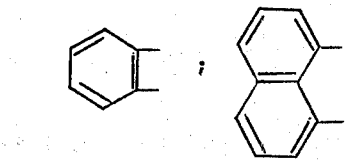

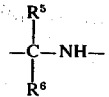

where $R^5$ and $R^6$ are hydrogen, alkyl with 1 to 8 carbon atoms, alkylthioalkyl with a total of 2 to 8 carbon atoms, $CH_3$—S—, alkoxyalkyl with a total of 2 to 8 carbon atoms, $CH_3O$- or phenyl,

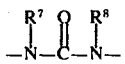

where $R^7$ and $R^8$ are hydrogen, alkyl with 1 to 8 carbon atoms, allyl or phenyl.

2. A triazine sulphenimide according to claim 1 wherein
X is

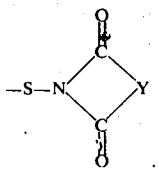

3. A triazine sulphenimide according to claim 2 wherein both

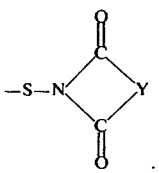

groups in the molecule are the same.

4. A triazine sulphenimide according to claim 3 wherein
Y is

5. A triazine sulphenimide according to claim 4 wherein $R^5$ and $R^6$ are hydrogen.
6. A triazine sulphenimide according to claim 5 wherein $R^1$ and $R^2$ are both alkyl of 1 to 4 carbon atoms.
7. A triazine sulphenimide according to claim 6 wherein $R^1$ and $R^2$ are both ethyl.
8. A triazine sulphenimide according to claim 4 wherein $R^5$ and $R^6$ are methyl.
9. A triazine sulphenimide according to claim 8 wherein $R^1$ and $R^2$ are both ethyl.
10. A triazine sulphenimide according to claim 3 wherein
Y is

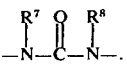

11. A triazine sulphenimide according to claim 10 wherein $R^7$ and $R^8$ are both methyl.
12. A triazine sulphenimide according to claim 3 wherein Y is —$CH_2CH_2$—

13. A triazine sulphenimide according to claim 13 wherein $R^1$ and $R^2$ are both alkyl of 1 to 2 carbon atoms.

14. A triazine sulphenimide according to claim 3 wherein Y is

15. A triazine sulphenimide according to claim 14 wherein $R^1$ and $R^2$ are both ethyl.
16. A triazine sulphenimide according to claim 1 wherein
X is

17. A triazine sulphenimide according to claim 16 wherein at least one of $R^1$ and $R^2$ and at least one of $R^3$ and $R^4$ is alkyl of 1 to 4 carbon atoms.
18. A triazine sulphenimide according to claim 17 wherein
Y is

19. A triazine sulphenimide according to claim 1 wherein $R^5$ and $R^6$ are hydrogen or alkyl with 1 to 8 carbon atoms.
20. A triazine sulphenimide according to claim 19 wherein Y is other than

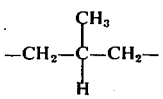

21. A triazine sulphenimide according to claim 1 wherein Y is other than

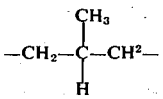

22. A triazine sulphenimide according to claim 1 wherein Y is a divalent hydrocarbon radical.
23. A triazine sulphenimide according to claim 22 wherein the Y hydrocarbon radical is an alkylene group.
24. A triazine sulphenimide according to claim 22 wherein the Y hydrocarbon radical is a member of a six membered carbon ring.
25. A triazine sulphenimide according to claim 1 wherein

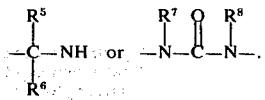

26. A triazine sulphenimide according to claim 25 wherein $R^5$ and $R^6$ are hydrogen, alkyl of 1 to 8 carbon atoms or phenyl.

* * * * *